July 23, 1963 R. M. DREXINGER ET AL 3,098,494

APPARATUS FOR TREATING ARTICLES

Filed May 24, 1962 5 Sheets-Sheet 1

INVENTORS
R.M. DREXINGER
S. KUBA

BY W. A. Johnson
ATTORNEY

July 23, 1963 R. M. DREXINGER ET AL 3,098,494

APPARATUS FOR TREATING ARTICLES

Filed May 24, 1962 5 Sheets-Sheet 2

INVENTORS
R. M. DREXINGER
S. KUBA
BY W. A. Johnson
ATTORNEY

INVENTORS
R. M. DREXINGER
S. KUBA
BY [signature]
ATTORNEY

INVENTORS
R. M. DREXINGER
S. KUBA
BY [signature]
ATTORNEY

July 23, 1963 R. M. DREXINGER ET AL 3,098,494

APPARATUS FOR TREATING ARTICLES

Filed May 24, 1962 5 Sheets-Sheet 5

INVENTORS
R. M. DREXINGER
S. KUBA

BY W. A. Johnson
ATTORNEY 3,098,494

APPARATUS FOR TREATING ARTICLES

Robert M. Drexinger, Bethlehem, and Samuel Kuba, Allentown, Pa., assignors to Western Electric Company, Incorporated, New York, N.Y., a corporation of New York Filed May 24, 1962, Ser. No. 197,409
6 Claims. (Cl. 134—70)

This invention relates to apparatus for treating articles, particularly apparatus for etching stud supporting wafers.

In the manufacture of certain types of components, such as diodes, germanium wafers are mounted on studs of conductive material and these studs are to be positioned in cylindrical conductive ends of dielectric sleeves where they are to be associated with conductive pins also mounted in the dielectric sleeve.

Prior to assembly of the wafer carrying studs in the dielectric sleeves, the wafers must be treated, that is, moved through a series of processing steps including suitable etching steps and the desired treating actions associated therewith. Elongated racks are utilized to support groups of the wafer carrying studs, or articles, to be treated in carrying the studs to an assembly machine and these racks may be employed in moving the wafer carrying studs into and through a series of treating or etching steps.

An object of the present invention is an apparatus which is simple in structure and highly efficient in treating articles, such as germanium wafers.

In accordance with the object the apparatus for treating portions of groups of articles carried by like elongated racks, with the portions to be treated initially extending downwardly from the racks includes open top tanks for treating liquids mounted on a support at treating stations with parallel tracks positioned above the stations and endless conveyors with spaced push pins extending downwardly therefrom to engage opposing ends of the rack and move them into and out of the treating stations.

Other objects and advantages will be apparent from the following detailed description when considered in conjunction with the accompanying drawings wherein:

FIGS. 1 and 2, when placed numerically end to end illustrate a top plan view of the apparatus;

FIGS. 3 and 4, when placed numerically end to end illustrate a vertical sectional view of the apparatus;

Figure 1:
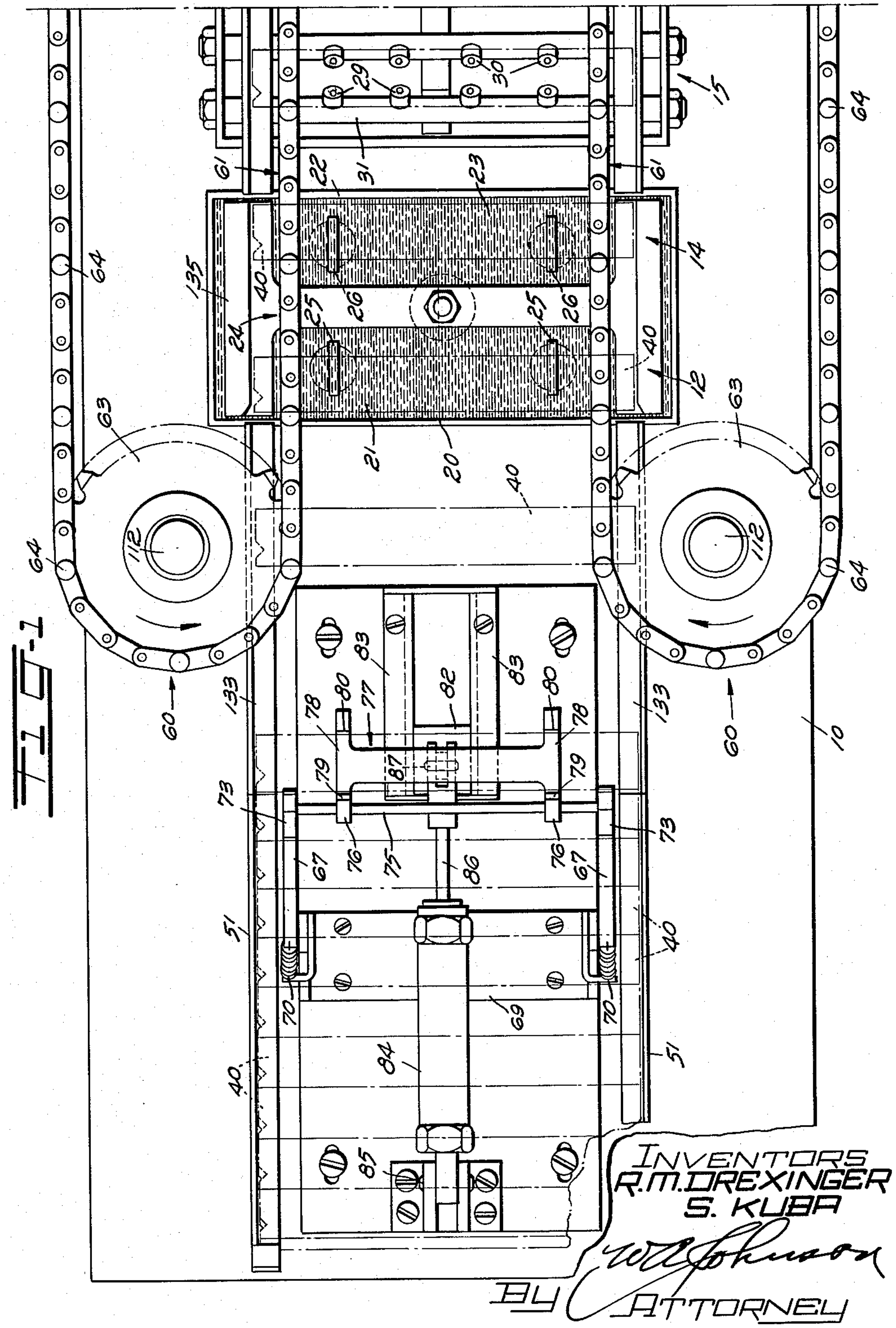
Figure 2:
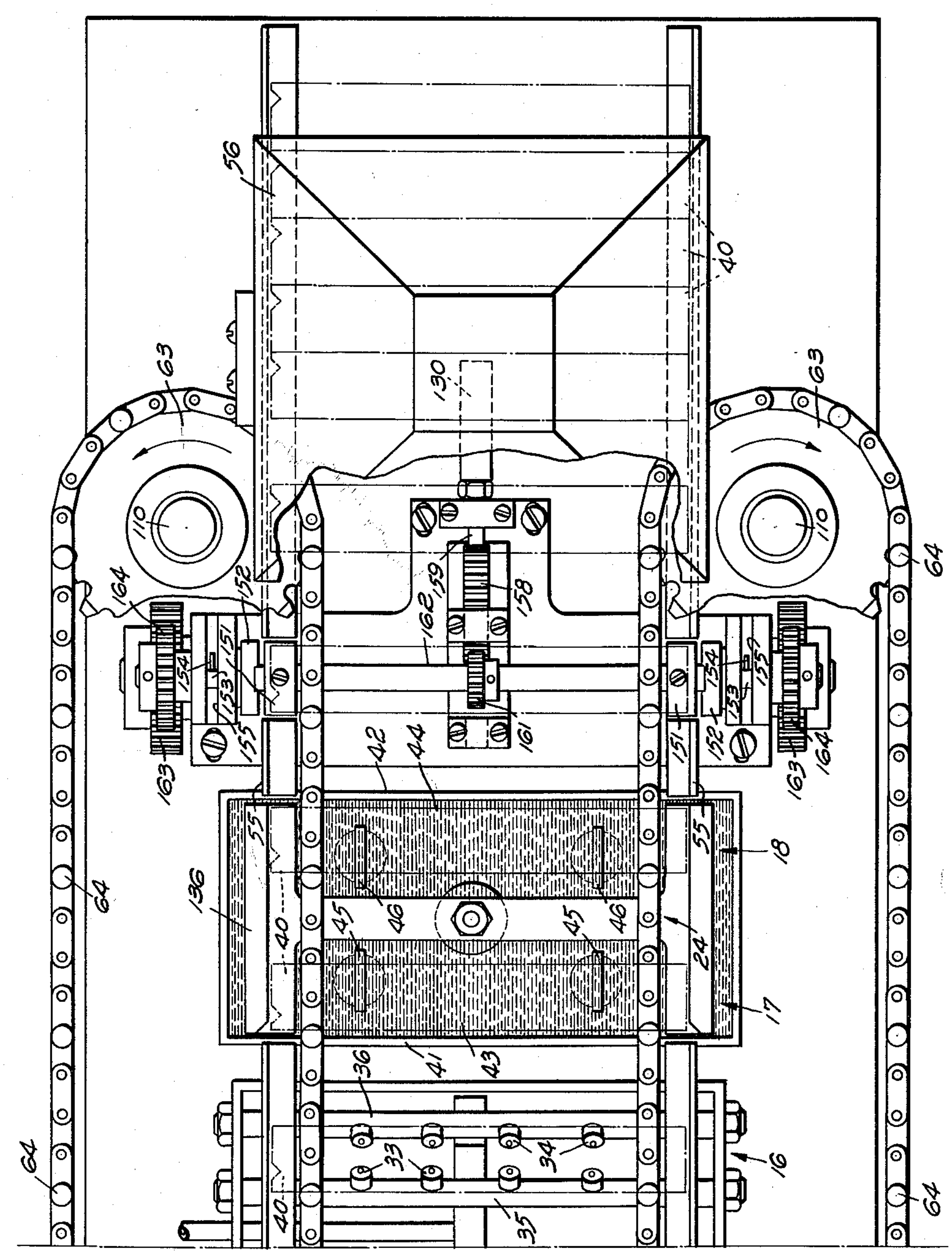

The apparatus includes a main support 10 mounted on a base 11. The apparatus is provided with a number of treating stations which include an etching station 12, a stabilizing stations 14, rinsing stations 15 and 16, washing stations 17 and 18 and an inverting station 19. An open top tank 20 at the etching station 12, contains etching liquid 21 while an open top tank 22, at the stabilizing station 14, contains a stabilizing liquid or bath 23. The tanks 20 and 22 may be of a single structure, if desired, with a central divider 24 mounted on the support 10 and provided with pairs of agitators 25 and 26. The rinsing stations 15 and 16 are disposed in a simple tank 28 mounted on the support 10 and including groups of spray nozzles 29 and 30 extending from supply lines 31 and 32 for the station 15 and spray nozzles 33 and 34 extending from supply lines 35 and 36 at station 16. The supply lines may be connected in a unit 38 controlled to operate when the trays 40 are at rest in the stations 15 and 16. Tanks 41 and 42, similar to tanks 20 and 22, disposed at stations 17 and 18 are mounted on the support

10 and contain baths 43 and 44 of cleansing liquid such as acetone or alcohol. Pairs of agitators 45 and 46 are disposed in the tanks 41 and 42 to keep the liquids or baths 43 and 44 at desired agitated conditions.

Figures 3, 7:
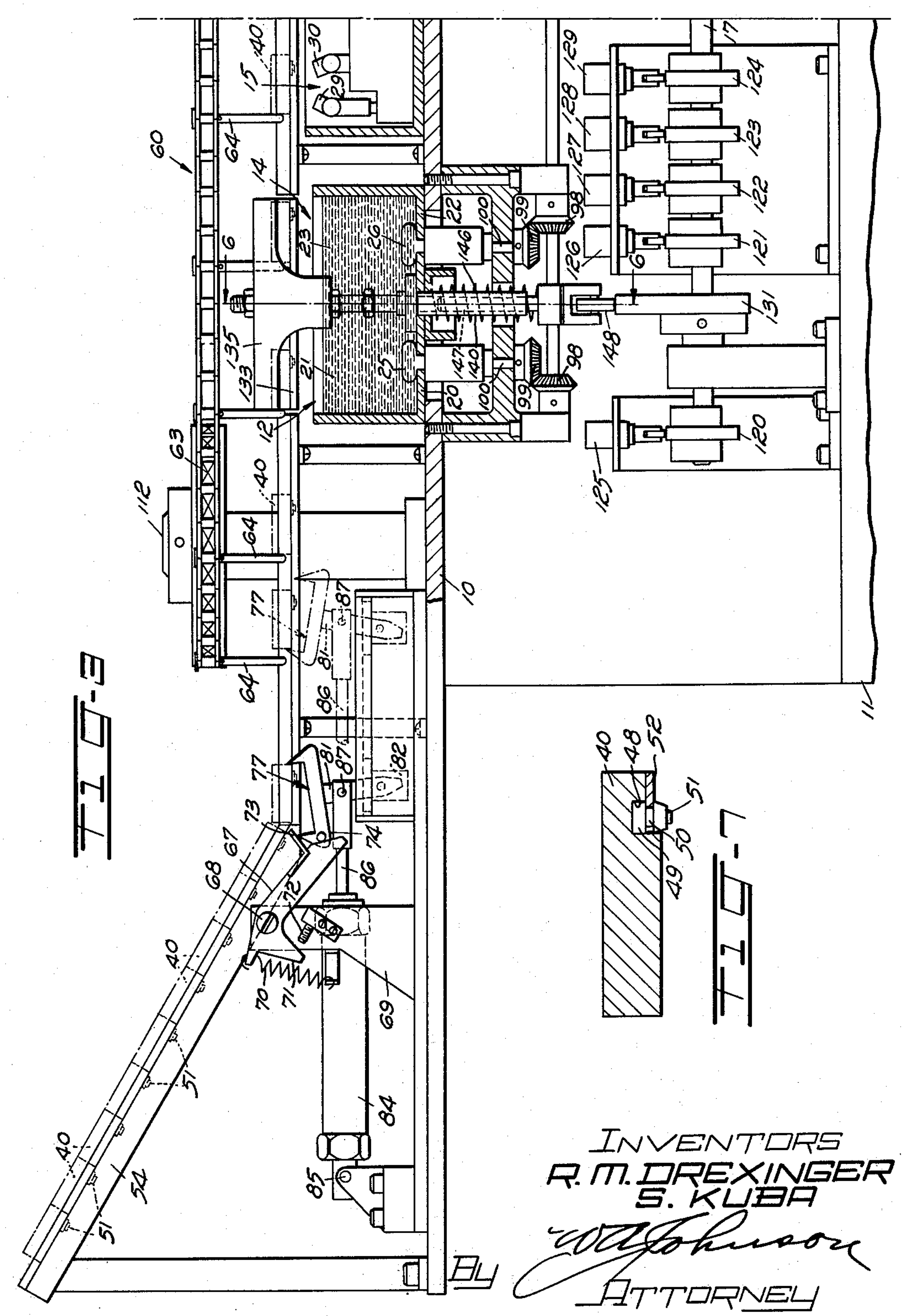
FIG. 7 is an enlarged sectional view of one of the racks.

The like elongated racks 40, as shown in section in FIG. 7, have grooves 48 throughout their lengths to receive the articles to be treated. These atricles are studs 49 having annular grooves 50 therein intermediate their ends and germanium wafers 51 mounted, in this instance, on the outer or lower ends of the studs. The studs are held in the groove 48 of each rack by a rail-like plate 52 mounted to extend into the grooves of the articles, that is, the studs 49.

The racks 40 are moved successively down an inclined chute, or stationary conveyor 54 toward an exit end thereof where they are stopped adjacent entrance ends of spaced parallel tracks 55 extending through the areas of the stations 12 to 19 inclusive, and also through the area of a drying station 56. A pair of endless conveyors 60 is mounted above the tracks 55 so that their inner portions, indicated generally at 61, will extend over opposing ends of the racks positioned on the tracks 55. In actual structure the conveyors are endless chains extending around pairs of sprockets 63 and carrying push pins 64 at equally spaced positions extending downwardly so that companion pairs of push pins will engage opposing ends of successive racks 40 to move them intermittently relative to the processing stations.

A feeding means for the trays shown at the left of FIGS. 1 and 3 includes retaining elements 67 pivotally mounted at 68 on vertical portions of a bracket 69 and normally urged counter-clockwise by spring 70 until projections 71 thereof engage adjustable stops 72. The retaining elements 67 have angular members 73 fixed thereto so that the upwardly projecting portions thereof may extend in front of the ends of the leading rack 40 adjacent the exit ends of the chute 54. The ends of the element 67 farthest from the pivots 68 have diagonal surfaces 74 positioned to be engaged by the ends of an actuating pin or rod 75 supported by jaws 76 of a feeder 77. The feeder 77 has recesses 78 in the jaws 76 to receive the racks 40 singly between projections or teeth 79 and 80. A shank 81, mounted centrally of the feeder 77, is pivotally supported by a carriage 82 positioned between guides 83 mounted on the support 10. An air cylinder 84, pivotally supported at 85 has a piston rod 86 pivotally connected at 87 to the shank 81 and constitutes the means for moving the feeder 77 between the receiving position shown in solid lines and the locating position shown in broken lines in FIG. 3.

Drive means for the apparatus begins with a motor 90, driven at a predetermined normal speed, the shaft 91 of the motor driving a pulley 92 and an intermittent gear 93. The pulley 92, is operatively connected to a drive unit 94, through a belt 95 and a pulley 96. The drive unit 94 is adapted to drive parallel shafts 97, FIGS. 3, 4 and 6, to drive the pairs of agitators 25, 26, 45 and 46 through bevelled gears 98, mounted on the shafts 97, and bevelled gears 99, mounted on spindles 100 of the agitators 25, 26, 45 and 46.

Figure 4:
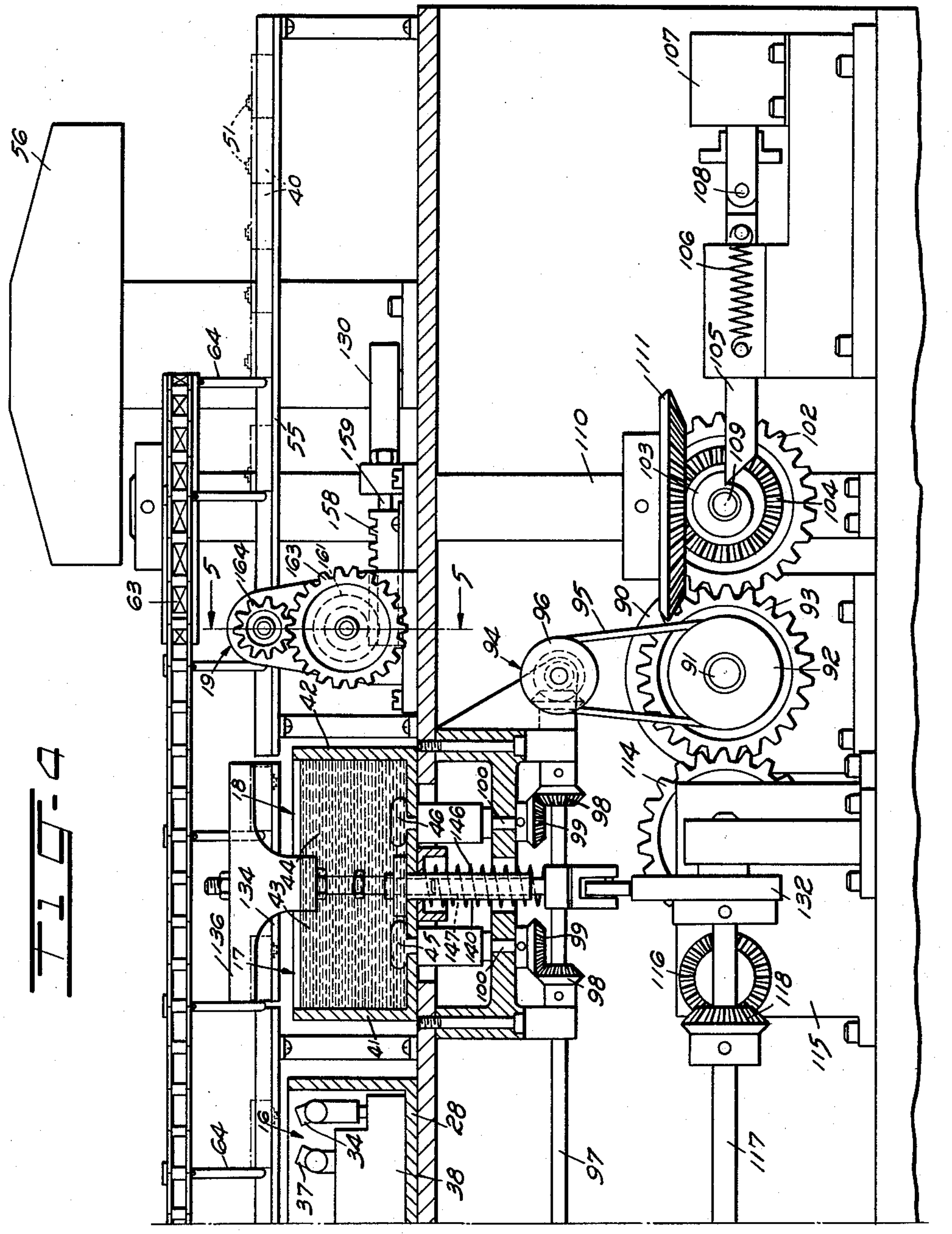

The drive means for the conveyors 60 begins with a gear 102 driven by the intermediate gear 93 FIG. 4 and connected through a one revolution clutch 103 to bevelled gears 104. The one revolution clutch is under the control of a clutch release 105 normally urged to the left by spring 106. A solenoid 107, fixed at 108 to the clutch release 105, when energized causes releasing of the clutch for a single cycle of a shaft 109. There is only one clutch 103 controlling the driving of shaft 109 but there are two bevelled gears 104 mounted on the shaft 109, one for each conveyor 60. The sprockets at the right end of each conveyor are mounted on vertical drive shafts 110 and these drive shafts have gears 111 mounted on the lower ends thereof to be engaged by their respective bevelled gears 104. The ratio between gears 104 and their respective gears 111 is 1:6 causing the sprockets mounted on the drive shafts 110 to move ⅙ of a revolution during each operating cycle of the one revolution clutch 103 so that the conveyors 60 will be moved the distances between the centers of the pins 64 to simultaneously advance the racks 40 like distances to successively move them through the stations. The other sprocket 63 in FIGS. 1 and 3 are mounted for rotation on shafts 112.

Figure 6:
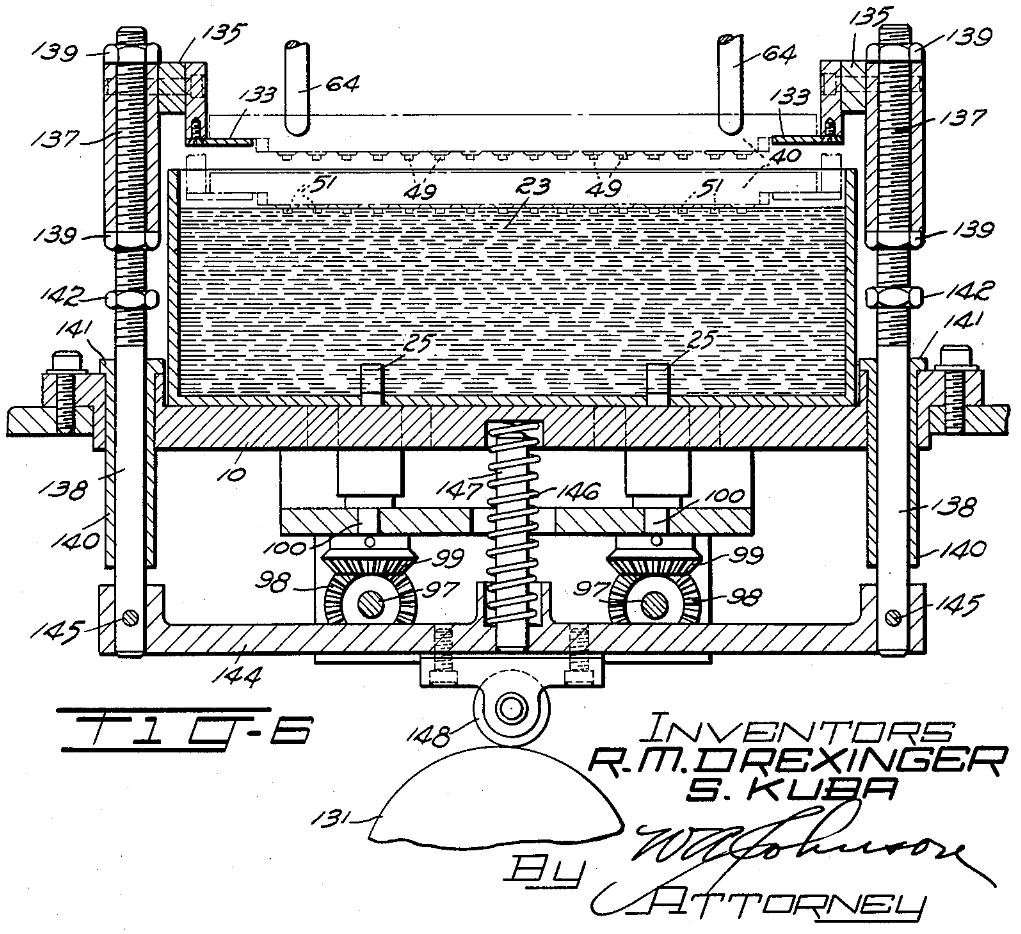
FIG. 6 is an enlarged sectional view taken along the line 6—6 of FIG. 3.

The intermediate gear 93 FIG. 4 drives an input gear 114 of a speed reduction unit 115, the output bevelled gear 116 of which drives cam shaft 117 through a bevelled gear 118. Cams 120, 121, 122, 123 and 124, mounted on cam shaft 117, operate switches 125, 126, 127, 128 and 129 at predetermined intervals during each operating cycle of the cam shaft to control various units of the apparatus, such as the air cylinder 84, the solenoid 107 and an air cylinder 130 of the inverting station 19. Cams 131 and 132, mounted on the cam shaft 117, are positioned to operate movable sections 133 and 134 of the main track 55. The movable sections 133 and 134 of the main tracks 55 are fixed to holders 135 and 136. These structures associated with the holders 135 and 136 are identical and a description of the one shown in FIG. 6 will apply to both. In FIG. 6 a sectional view of the holders 135 shows that they are adjustably positioned on threaded ends 137 of supports such as rods 138 and held in adjusted positions by nuts 139. The rods 138 are slidable vertically in guide bushings 140 mounted in apertures of the support 10, and have upper flanged ends 141 positioned to be engaged by stop nuts 142 adjustably positioned on the rods to control the positioning of the articles being treated in the baths of the respective tanks. The lower ends of the rods 138 are mounted in apertures of an actuator 144 where they are fixed at 145, the actuator being urged downwardly by a spring 146 disposed concentric with a rod 147 supported by the actuator to cause a roller or cam follower 148, mounted on the actuator, to ride on its respective cam 131.

Figure 5:
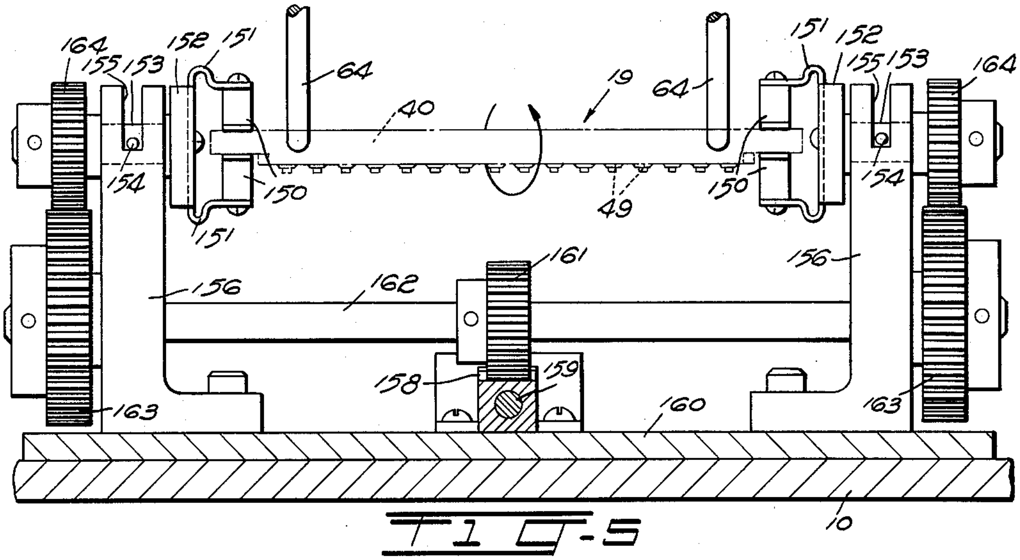
FIG. 5 is an enlarged fragmentary sectional view taken along the line 5—5 of FIG. 4.

The inverting station 19, FIGS. 4 and 5, includes pairs of grippers 150, supported by springs or resilient portions 151 of members 152, mounted on inner ends of spindles 153 and adapted to receive the ends of the successive racks 40 and hold the racks while being turned 180°. The pairs of grippers 150, in this instance, may be disposed in open portions of the main tracks 55 and adapted to have the ends of the racks 40 forced therebetween so that there is sufficient holding force of the grippers on the ends of the racks to maintain the racks against displacement during the inverting operation. The spindles 153 have pins 154, extending in one direction therefrom and positioned in notches 155 of supporting brackets 156, serving as stopping means at each half cycle of each spindle. The spindles 153 are driven by forward and return movements of a rack 158 connected to a piston rod 159 of the air cylinder 130 and movable on a member 160 mounted on the support 10 to drive a pinion 161 mounted on the shaft 162. Gears 163 are mounted on the ends of the shaft 162 and engage pinions 164 mounted on the spindles 153. The air cylinder 130 may be operated to invert one tray and hold its position until that tray is moved away from the grippers 150 and then return to its starting position or it may operate one half cycle for each successive tray. It is important that each tray be inverted to locate the articles or the wafer carrying studs uppermost before leaving the area of the conveyors 60 and moving beneath the dryer 56.

*Operation*

In following a single rack 40 through the apparatus, this rack is released from the chute 54 when the feeder 77, FIG. 3, is moved to the solid line position to cause the elements 67 to release the leading rack to drop onto the tracks 55. Operation of the air cylinder 84 forwardly will cause the feeder 77 to move the rack to the position shown by the broken line position of the feeder 77 where it will be in the area of the conveyors 60. When in this position, the rack will be engaged by a pair of push pins 64, which will escort this tray intermittently into and out of the successive stations 12, 14, 15, 16, 17, 18 and 19. When at station 12, the tray will be supported on the movable sections 133 of the tracks 55 and through operation of the cam 131, it will be lowered so as to submerge the portions of the articles or the wafer 51 of the studs 49 into the etching bath 21. At station 14, the track sections 133 of the supports 135, under the control of the cam 131 will lower the rack to position the articles in the stabilizing liquid or bath 23. At station 15, and also at 16, the articles or wafers are subjected to sprays of water to rinse the preceding liquids therefrom. At stations 17 and 18, the rack will be on the movable track sections 134 and during each interval, through operation of the cam 132, the rack will be lowered at first into the bath 43 at station 17 and into the bath 44 at station 18. When the rack reaches the inverting station 19 its ends will be located between the grippers 150 and during operation of the air cylinder 130, the tray will be inverted to locate the articles or wafers on the upper portion of the rack to face upwardly as they move beneath the dryer 56. The reason for drying in upright position is to prevent residues from being deposited on etched wafer surface. The dryer 56, in the present form, includes suitable heating means in a hood covering the area where the racks and articles therein will be subjected to the heat of the dryer during a plurality of operating cycles of the apparatus. At this point, the racks are close together and are only moved when the successive racks are forced from the areas from the conveyors 60.

After the apparatus has been in operation for a number of cycles the racks at all stations are advanced simultaneously through the synchronized movements of the pins 64 of both conveyors 60 so that there will be a rack at each processing station ready to receive the treatment or action to be performed at those stations. Furthermore, the apparatus is completely automatic in its action requiring only the loading of the feeding chute 54 and the provision of any desired structure at the exit end of the apparatus such as the continuation of the main tracks 55 for the trays moving out of the apparatus.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for treating portions of groups of articles carried by like elongated racks with the portions to be treated initially extending downwardly from the racks, comprising:

a main support, open top tanks of treating liquids mounted on the support at spaced treating stations, spaced parallel tracks for supporting ends of the racks extending through the apparatus from entrance ends to exit ends thereof, positioned above the main support and supported thereby, endless conveyors supported above the tracks, push pins extending downwardly from the conveyors to engage opposing ends of the racks and move the racks into and out of the treating stations, drive shafts are operatively connected to the conveyors, power means operable to cause the drive shafts to move the conveyors like distances to advance the racks successively to the stations, movable sections for the tracks disposed at certain of the stations,
holders for the track sections, and
means operable to move the holders to cause submersion of the portions of the articles into the treating liquid of certain of the tanks comprising:
movable supports for the holders, and
means actuable to secure the holders at variable positions on said supports to align the movable track sections with the tracks.

2. An apparatus for treating portions of groups of articles carried by like elongated racks with the portions to be treated initially extending downwardly from the racks, comprising:
a main support,
open top tanks of treating liquids mounted on the support at spaced treating stations,
spaced parallel tracks for supporting ends of the racks extending through the apparatus from entrance ends to exit ends thereof, positioned above the main support and supported thereby,
endless conveyors supported above the tracks,
push pins extending downwardly from the conveyors to engage opposing ends of the racks and move the racks into and out of the treating stations,
drive shafts are operatively connected to the conveyors,
power means operable to cause the drive shafts to move the conveyors like distances to advance the racks successively to the stations,
movable sections for the tracks disposed at certain of the stations,
holders for the track sections,
means operable to move the holders to cause submersion of the portions of the articles into the treating liquid of certain of the tanks comprising:
movable supports for the holders,
means actuable to secure the holders at variable positions on said supports to align the movable track sections with the tracks,
stationary locating members disposed adjacent the supports for the holders, and
elements adjustably mounted on said supports to limit movement of the holders toward the tanks to control the depth of submersion of the portions of the articles in the liquid.

3. An apparatus for treating portions of groups of articles carried by like elongated racks with the portions to be treated initially extending downwardly from the racks, comprising:
a main support,
open top tanks of treating liquids mounted on the support at spaced treating stations,
spaced parallel tracks for supporting ends of the racks extending through the apparatus from entrance ends to exit ends thereof, positioned above the main support and supported thereby,
endless conveyors supported above the tracks,
push pins extending downwardly from the conveyors to engage opposing ends of the racks and move the racks into and out of the treating stations,
drive shafts are operatively connected to the conveyors,
power means operable to cause the drive shafts to move the conveyors like distances to advance the racks successively to the stations,
movable sections for the tracks disposed at certain of the stations,
holders for the track sections,
means operable to move the holders to cause submersion of the portions of the articles into the treating liquid of certain of the tanks,
aligned openings in the tracks disposed beyond the treating stations,
grippers disposed in said opening and adapted to receive ends of successive racks, and
means to rotate the grippers one-half cycles to invert the racks to cause the treated portions of the groups of articles to extend upwardly.

4. An apparatus for treating portions of groups of articles carried by like elongated racks with the portions to be treated initially extending downwardly from the racks, comprising:
a main support,
open top tanks of treating liquids mounted on the support at spaced treating stations,
spaced parallel tracks for supporting ends of the racks extending through the apparatus from entrance ends to exit ends thereof, positioned above the main support and supported thereby,
endless conveyors supported above the tracks,
push pins extending downwardly from the conveyors to engage opposing ends of the racks and move the racks into and out of the treating stations,
drive shafts are operatively connected to the conveyors,
power means operable to cause the drive shafts to move the conveyors like distances to advance the racks successively to the stations,
movable sections for the tracks disposed at certain of the stations,
holders for the track sections,
means operable to move the holders to cause submersion of the portions of the articles into the treating liquid of certain of the tanks,
an inverting unit adapted to receive the racks successively and invert them so that the treated portions will extend upwardly, and
a unit mounted above the inverted racks to dry the treated portions of the groups of articles therein.

5. An apparatus for treating portions of groups of articles carried by like elongated racks with the portions to be treated initially extending downwardly from the racks, comprising:
a main support,
open top tanks of treating liquids mounted on the support at spaced treating stations,
spaced parallel tracks for supporting ends of the racks extending through the apparatus from entrance ends to exit ends thereof, positioned above the main support and supported thereby,
endless conveyors supported above the tracks,
push pins extending downwardly from the conveyors to engage opposing ends of the racks and move the racks into and out of the treating stations,
a drive shafts are operatively connected to the conveyors,
power means operable to cause the drive shafts to move the conveyors like distances to advance the racks successively to the stations,
movable sections for the tracks disposed at certain of the stations,
holders for the track sections,
means operable to move the holders to cause submersion of the portions of the articles into the treating liquid of certain of the tanks,
agitators for the liquids in the tanks, and
driving means for the agitators operatively connected to the power means.

6. An apparatus for treating portions of groups of articles carried by like elongated racks with the portions to be treated initially extending downwardly from the racks, comprising:
a main support,
open top tanks of treating liquids mounted on the support at spaced treating stations,
spaced parallel tracks for supporting ends of the racks extending through the apparatus from entrance ends to exit ends thereof, positioned above the main support and supported thereby,
endless conveyors supported above the tracks,
push pins extending downwardly from the conveyors to engage opposing ends of the racks and move the racks into and out of the treating stations,
drive shafts operatively connected to the conveyors,
power means for the drive shafts operable to cause the drive shafts to move the conveyors like distances to advance the racks successively to the stations,
movable sections for the tracks disposed at certain of the stations,
holders for the track sections,
means operable to move the holders to cause submersion of the portions of the articles into the treating liquid of certain of the tanks,
an inclined chute mounted with an exit end thereof disposed adjacent entrance ends of the tracks and adapted for the racks to move successively to the exit end,
a feeder adapted to move the racks successively between a receiving position at the entrance ends of the tracks and a position in the area of the conveyors,
a retaining element normally holding the racks against movement on the chute by holding a leading rack at the exit end of the chute, and
means carried by the feeder to actuate the retaining element to release the leading rack on the chute to move into the receiving position.

References Cited in the file of this patent

UNITED STATES PATENTS

| | | |
|---|---|---|
| 1,533,150 | Ulrich | Apr. 14, 1925 |
| 2,048,937 | Larson | July 28, 1936 |
| 2,342,598 | Ozouf | Feb. 22, 1944 |
| 2,718,895 | Thomas | Sept. 27, 1955 |
| 2,814,069 | Lenhart | Nov. 26, 1957 |
| 2,894,516 | Froehlich | July 14, 1959 |